US010708797B2

(12) United States Patent
Yap et al.

(10) Patent No.: US 10,708,797 B2
(45) Date of Patent: Jul. 7, 2020

(54) RESPONDING TO A QUERY IN A COMMUNICATION SYSTEM

(71) Applicant: MOTOROLA SOLUTIONS, INC., Chicago, IL (US)

(72) Inventors: Chin Chuan Yap, Penang (MY); Woei Chyuan Tan, Penang (MY)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days.

(21) Appl. No.: 15/997,249

(22) Filed: Jun. 4, 2018

(65) Prior Publication Data

US 2019/0373489 A1    Dec. 5, 2019

(51) Int. Cl.
| H04W 4/08 | (2009.01) |
| H04W 24/08 | (2009.01) |
| H04B 17/345 | (2015.01) |
| G10L 13/04 | (2013.01) |
| H04W 4/20 | (2018.01) |

(52) U.S. Cl.
CPC .......... *H04W 24/08* (2013.01); *G10L 13/043* (2013.01); *H04B 17/345* (2015.01); *H04W 4/20* (2013.01)

(58) Field of Classification Search
CPC ......... H04W 4/10; H04W 4/90; H04W 24/02; H04W 4/08; H04L 47/14; H04L 65/4038; H04L 65/4061
See application file for complete search history.

(56) References Cited

U.S. PATENT DOCUMENTS

| 6,773,344 B1 * | 8/2004 | Gabai ...................... A63H 3/28 463/1 |
| 7,069,014 B1 | 6/2006 | Thenthiruperai et al. |
| 8,213,580 B2 * | 7/2012 | Chen ................... G10L 19/0018 379/88.11 |

(Continued)

FOREIGN PATENT DOCUMENTS

JP      2008-109595 A     5/2005

OTHER PUBLICATIONS

International Search Report & Written Opinion dated Jul. 17, 1019 for related International Application No. PCT/US2019/032728 (14 pages).

*Primary Examiner* — Phuc H Tran
(74) *Attorney, Agent, or Firm* — Michael Best & Friedrich LLP

(57) ABSTRACT

Methods and systems for responding to a query in a communication system. One system includes an electronic computing device including a transceiver configured to receive a query from a communication device. The electronic computing device further includes an electronic processor configured to generate a response to the query, and determine a channel availability of a communication system that the electronic computing device uses to communicate with the communication device. The electronic processor is further configured to transmit, via the transceiver, the response to the communication device as voice data over a voice channel in response to determining that the channel availability is above a predetermined threshold. The electronic processor is further configured to transmit the response to the communication device as text data over a text channel separate from the voice channel in response to determining that the channel availability is below the predetermined threshold.

18 Claims, 4 Drawing Sheets

(56) References Cited

U.S. PATENT DOCUMENTS

| | | | | |
|---|---|---|---|---|
| 8,768,307 | B1* | 7/2014 | Heins | H04M 3/00 |
| | | | | 455/3.06 |
| 9,166,881 | B1* | 10/2015 | Gray | H04L 43/0894 |
| 9,203,979 | B1* | 12/2015 | Jaccino | H04M 19/04 |
| 9,380,146 | B1* | 6/2016 | Gopalakrishnan | G10L 13/08 |
| 10,069,965 | B2* | 9/2018 | Karimi-Cherkandi | |
| | | | | H04L 43/16 |
| 10,187,894 | B1* | 1/2019 | Naim | H04W 28/0215 |
| 10,313,425 | B2* | 6/2019 | Macchietti | H04L 67/06 |
| 2005/0215260 | A1* | 9/2005 | Ahya | H04W 84/02 |
| | | | | 455/452.2 |
| 2007/0036320 | A1 | 2/2007 | Mandalia et al. | |
| 2007/0130287 | A1* | 6/2007 | Kumar | A61N 1/08 |
| | | | | 709/217 |
| 2011/0177800 | A1* | 7/2011 | Gilson | H04W 4/12 |
| | | | | 455/417 |
| 2011/0222466 | A1 | 9/2011 | Pance et al. | |
| 2016/0371703 | A1* | 12/2016 | Monegan | G06Q 30/016 |
| 2017/0339535 | A1* | 11/2017 | Mazzarella | H04M 3/56 |
| 2018/0181656 | A1* | 6/2018 | Proctor | H04W 4/10 |
| 2018/0184257 | A1 | 6/2018 | Proctor | |
| 2018/0317058 | A1* | 11/2018 | Mazzarella | H04M 3/56 |

* cited by examiner

RESPONDING TO A QUERY IN A COMMUNICATION SYSTEM

BACKGROUND OF THE INVENTION

Tablets, laptops, phones (for example, cellular or satellite), mobile (vehicular) or portable (personal) two-way radios, and other communication devices are now in common use by users, such as first responders (including firefighters, police officers, and paramedics, among others), and provide such users and others with access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1A:
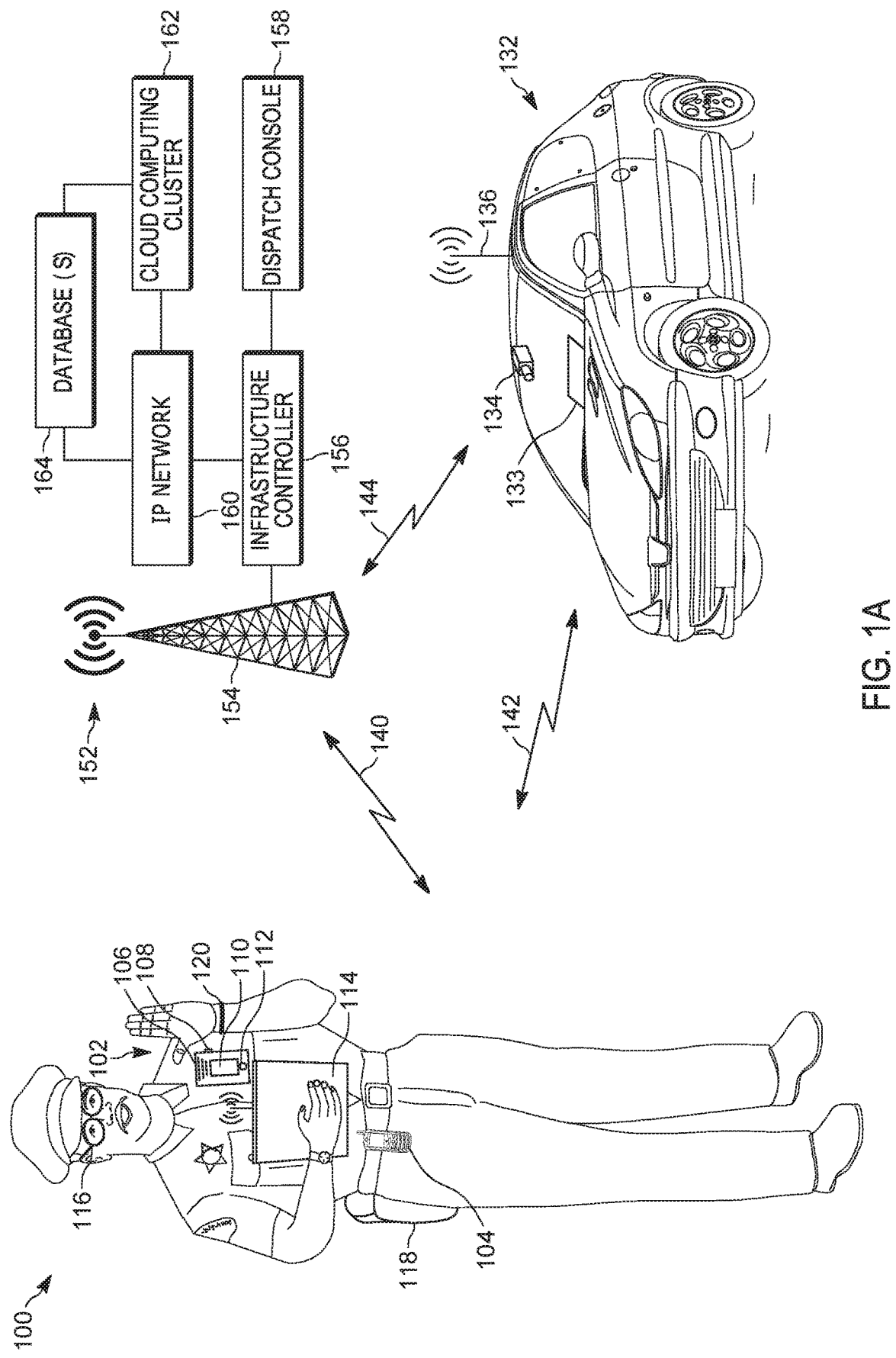
FIGS. 1A and 1B are system diagrams illustrating a system for operating an electronic digital assistant, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

When an electronic digital assistant generates a response to a query received from a remotely-located communication device, the electronic digital assistant may use a voice channel of a communication system to transmit the response to the communication device. However, transmitting the response using a voice channel in the communication system may cause a technological problem of decreasing channel availability for other communication within the communication system (for example, communication between communication devices of other users). Thus, transmitting the response as voice data over a voice channel may not be desirable when channel availability of the communication system is low. Additionally, transmitting the response as voice data over a voice channel may not be desirable in other situations. For example, transmitting voice data is less desirable when the response to the query is lengthy and includes a substantial amount of information that may be difficult for a user to remember when provided aurally. As another example, transmitting voice data is less desirable when a user who made the query is located in a loud environment where he/she may be unable to hear the voice data output by a speaker.

Disclosed are a method, device, and system for an electronic digital assistant to respond to a query in a communication system. The electronic digital assistant may determine channel availability of the communication system and transmit a response to a query based on the channel availability. For example, in response to determining that the channel availability is above a predetermined threshold, the electronic digital assistant transmits the response to the query as voice data over a voice channel of the communication system. On the other hand, in response to determining that the channel availability is below the predetermined threshold, the electronic digital assistant transmits the response to the query as text data over a text channel of the communication system. As explained in greater detail below, the disclosed method, device, and system solve a technological problem involving limited channel availability in a communication system by transmitting responses as text data over text channels when voice channel availability is limited. Thus, the disclosed method, device, and system improve the overall functionality of the communication system by allowing information to be transmitted in a more efficient manner and by helping to ensure that resources of the communication system are available for more communication devices than when the disclosed method, device, and system are not used.

One embodiment provides an electronic computing device including a transceiver configured to receive a query from a communication device. The electronic computing device further includes an electronic processor configured to generate a response to the query, and determine a channel availability of a communication system that the electronic computing device uses to communicate with the communication device. The electronic processor is further configured to transmit, via the transceiver, the response to the communication device as voice data over a voice channel in response to determining that the channel availability is above a predetermined threshold. The electronic processor is further configured to transmit the response to the communication device as text data over a text channel separate from the voice channel in response to determining that the channel availability is below the predetermined threshold.

Another embodiment provides a method of responding to a query in a communication system. The method includes receiving, by a transceiver of an electronic computing device, a query from a communication device. The method further includes generating, with an electronic processor of the electronic computing device, a response to the query. The method further includes determining, with the electronic processor, a channel availability of the communication system. The communication system is used by the electronic computing device to communicate with the communication device. The method further includes determining, with the electronic processor, that the channel availability is below a predetermined threshold. The method further includes transmitting, via the transceiver, the response to the communication device as text data over a text channel of the communication system in response to determining that the channel availability is below the predetermined threshold. The text channel is separate from a voice channel used to transmit voice data.

Another embodiment provides a communication system including a communication device configured to receive a query via an input device and transmit the query to an electronic computing device. The communication system further includes the electronic computing device that is configured to receive the query from the communication device, and generate a response to the query. The electronic computing device is further configured to determine a channel availability of the communication system. The electronic computing device is further configured to transmit the response to the communication device as voice data over a voice channel in response to determining that the channel availability is above a predetermined threshold. The communication device is configured to output the voice data on a speaker. The electronic computing device is further configured to transmit the response to the communication device as text data over a text channel separate from the voice channel in response to determining that the channel availability is below the predetermined threshold. The communication device is configured to convert the text data to synthesized voice data to be output by the speaker.

Each of the above-mentioned embodiments will be discussed in more detail below, starting with example communication system and device architectures of the system in which the embodiments may be practiced, followed by an illustration of processing steps for achieving the method, device, and system for an electronic digital assistant. Further advantages and features consistent with this disclosure will be set forth in the following detailed description, with reference to the figures.

Figure 1B:
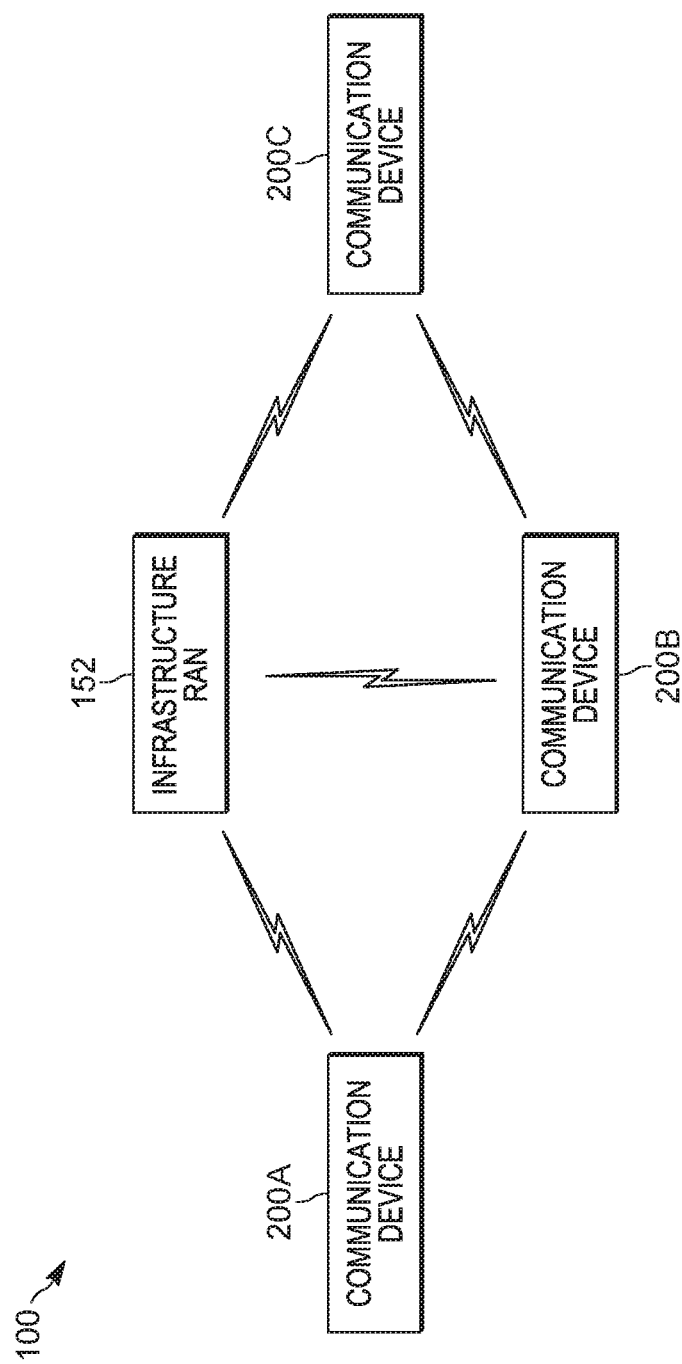

1. Communication System and Device Structures
   a. Communication System Structure Referring now to the drawings, and in particular FIG. 1A, a communication system diagram illustrates a system 100 of devices including a first set of devices that a user 102 (illustrated in FIG. 1A as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (for example, virtual reality, augmented reality, or mixed reality glasses), sensor-enabled holster 118, and/or biometric sensor wristband 120. Although FIG. 1A illustrates only a single user 102 with a respective first set of devices, in other embodiments, the single user 102 has additional sets of same or similar devices, and additional users may be present with respective additional sets of same or similar devices as indicated by FIG. 1B.

System 100 may also include a vehicle 132 associated with the user 102 having an integrated mobile communication device 133, an associated vehicular video camera 134, and a coupled vehicular transceiver 136. Although FIG. 1A illustrates only a single vehicle 132 with a single mobile communication device 133, respective single vehicular video camera 134 and/or microphone, and a single coupled vehicular transceiver 136, in other embodiments, the vehicle 132 includes additional same or similar mobile communication devices, video cameras, microphones, and/or transceivers, and additional vehicles may be present with respective additional sets of mobile communication devices, video cameras, microphones, and/or transceivers.

Each of the portable radio 104, RSM video capture device 106, laptop 114, and vehicular mobile communication device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices may be referred to as communication devices and are configured to receive inputs associated with the user 102 and/or provide outputs to the user 102 in addition to communicating information to and from other communication devices and the infrastructure RAN 152.

The portable radio 104, in particular, may be any communication device used for infrastructure RAN or direct-mode media (for example, voice, audio, video, etc.) communication via a long-range wireless transmitter and/or transceiver that has a transmitter transmit range on the order of miles, for example, 0.5-50 miles, or 3-20 miles (for example, in comparison to a short-range transmitter such as a Bluetooth, Zigbee, or NFC transmitter) with other communication devices and/or the infrastructure RAN 152. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter implements a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter implements a Wi-Fi protocol perhaps in accordance with an IEEE 802.11 standard (for example, 802.11a, 802.11b, 802.11g) or a WiMAX protocol perhaps operating in accordance with an IEEE 802.16 standard.

In the example of FIG. 1A, the portable radio 104 forms the hub of communication connectivity for the user 102, through which other accessory devices, such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 communicatively couple.

In order to communicate with and exchange video, audio, and other media and communications with the RSM video capture device 106, laptop 114, and/or smart glasses 116, the portable radio 104 may contain one or more physical electronic ports (such as a USB port, an Ethernet port, an audio jack, etc.) for direct electronic coupling with the RSM video capture device 106, laptop 114, and/or smart glasses 116. In some embodiments, the portable radio 104 contains a short-range transmitter (for example, in comparison to the long-range transmitter such as a LMR or Broadband transmitter) and/or transceiver for wirelessly coupling with the RSM video capture device 106, laptop 114, and/or smart glasses 116. The short-range transmitter may be a Bluetooth, Zigbee, or NFC transmitter having a transmit range on the order of 0.01-100 meters, or 0.1-10 meters. In other embodiments, the RSM video capture device 106, the laptop 114, and/or the smart glasses 116 contain their own long-range transceivers and communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture that allows a single communication device to communicate with one or more group members (not shown) associated with a particular group of devices at a same time.

Additional features may be provided at the RSM video capture device 106 as well. For example, a display screen 110 is provided for displaying images, video, and/or text to the user 102 or to someone else. The display screen 110 is, for example, a liquid crystal display (LCD) screen or an organic light emitting display (OLED) display screen. In some embodiments, a touch sensitive input interface is incorporated into the display screen 110 as well, allowing the user 102 to interact with content provided on the display screen 110. A soft PTT input is also provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone are used, for example, for capturing audio and/or video of a field-of-view associated with the user 102, perhaps including a suspect and the suspect's surroundings, storing the captured image and/or audio data for further analysis or transmitting the captured audio and/or video data as an audio and/or video stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that is capable of identifying a direction from which a captured sound emanated.

In some embodiments, the RSM video capture device 106 is replaced with a more limited body worn camera that includes the video camera 112 and/or microphone noted above for capturing audio and/or video, but foregoes one or more of the features noted above that transform the body worn camera into a more full featured RSM, such as the separate physical PTT switch 108 and the display screen 110, and remote microphone functionality for voice communications in cooperation with portable radio 104.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 114 display screen is, for example, an LCD screen or an OLED display screen. In some embodiments, a touch sensitive input interface is incorporated into the display screen as well, allowing the user 102 to interact with content provided on the display screen. A soft PTT input is also provided, for example, via such a touch interface.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 also detects whether the first responder's hand is resting on the weapon even if it has not yet been removed from the holster and provide such information to portable radio 104. In some embodiments, a weapon of the user 102 includes a sensor that detects when the weapon is discharged. The detected discharge is reported to the portable radio 104, for example. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 includes its own long-range transceiver and communicates with other communication devices and/or with the infrastructure RAN 152 or vehicular transceiver 136 directly without passing through portable radio 104.

Although the biometric sensor wristband 120 is shown in FIG. 1A as a bracelet worn around the wrist, in other examples, the biometric sensor wristband 120 additionally and/or alternatively is worn around another part of the body, or takes a different physical form including an earring, a finger ring, a necklace, a glove, a belt, or some other type of wearable, ingestible, or insertable form factor. In some embodiments, the biometric sensor wristband 120 or another device of the user 102 detects characteristics of the environment of the user 102 (for example, temperature, humidity, air quality, ambient noise level, and the like).

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, Bluetooth Low Energy, WiFi, Near Field Communication (NFC), Radio Frequency ID (RFID) or other short-range wireless protocol having a transmission range on the order of meters, tens of meters, or hundreds of meters.

The portable radio 104 and/or RSM video capture device 106 (or any other device in FIG. 1A for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device is, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 102 may include the mobile communication device 133, the vehicular video camera 134 and/or microphone, and the vehicular transceiver 136, all of which may be coupled to one another via a wired and/or wireless vehicle area network (VAN), perhaps along with other sensors physically or communicatively coupled to the vehicle 132. In some embodiments, the vehicle 132 includes one or more occupant sensors that sense, for example, whether a seat is occupied. For example, an occupant sensor in the back seat of a police vehicle indicates whether a suspect is present in the vehicle 132. The vehicular transceiver 136 may include a long-range transceiver for directly wirelessly communicating with communication devices such as the portable radio 104, the RSM 106, and the laptop 114 via wireless link(s) 142 and/or for wirelessly communicating with the RAN 152 via wireless link(s) 144. The vehicular transceiver 136 may further include a short-range wireless transceiver or wired transceiver for communicatively coupling between the mobile communication device 133, the vehicular video camera 134, and/or the one or more occupant sensors in the VAN. The mobile communication device 133 may include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other communication devices, and/or the infrastructure RAN 152 for further analysis. A microphone (not shown), or an array thereof, may be integrated in the video camera 134 and/or at the mobile communication device 133 (or additionally or alternatively made available at a separate location of the vehicle 132) and communicatively coupled to the mobile communication device 133 and/or vehicular transceiver 136 for capturing audio and storing, processing, and/or transmitting the audio in a same or similar manner to the video as set forth above. The omni-directional or unidirectional microphone, or an array thereof, may be integrated in the video camera 134 and/or at the mobile communication device 133 (or additionally or alternatively made available at a separate location of the vehicle 132) and communicably coupled to the mobile communication device 133 and/or vehicular transceiver 136 for capturing audio and storing, processing, and/or transmitting the audio in a same or similar manner as set forth above with respect to the RSM 106.

The vehicle 132 may be a human-operable vehicle, or may be a self-driving vehicle operable under control of the mobile communication device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link).

The vehicle 132 and/or transceiver 136, similar to the portable radio 104 and/or respective receivers, transmitters, or transceivers thereof, may include a location (and/or orientation) determination device integrated with or separately disposed in the mobile communication device 133 and/or transceiver 136 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above is disposed, and similarly communicates with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN provide infrastructure communications to the other, depending on the situation and the types of devices in the VAN and/or PAN and provide interoperability and communication links between devices (such as video cameras) and sensors within the VAN and PAN.

Although the RSM 106, the laptop 114, and the vehicle 132 are illustrated in FIG. 1A as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

In some embodiments, one or more of the user 102, the vehicle 132, the portable radio 104, the RSM video capture device 106, and any other device in FIG. 1A is equipped with an environmental sensor such as a chemical, biological, radiological, nuclear, or explosive (CBRNE) sensor. Measurements made by the CBRNE sensor may be stored locally or transmitted via a transmitter or transceiver to other communication devices and/or to the infrastructure RAN 152.

Infrastructure RAN 152 is a radio access network that provides for radio communication links to be arranged within the network between a plurality of user terminals. Such user terminals may be portable, mobile, or stationary and may include any one or more of the communication devices illustrated in FIG. 1A, among other possibilities. At least one other terminal, for example used in conjunction with the communication devices, may be a fixed terminal 154, for example a base station, eNodeB, repeater, and/or access point. Such a RAN 152 typically includes a system infrastructure that generally includes a network of various fixed terminals 154, which are in direct radio communication with the communication devices. Each of the fixed terminals 154 operating in the RAN 152 may have one or more transceivers which may serve communication devices in a given region or area, known as a 'cell' or 'site', by radio frequency (RF) communication. The communication devices that are in direct communication with a particular fixed terminal 154 are said to be served by the fixed terminal 154. In one example, all radio communications to and from each communication device within the RAN 152 are made via respective serving fixed terminals 154. Sites of neighboring fixed terminals 154 may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a WLAN technology such as Wi-Fi perhaps operating in accordance with an IEEE 802.11 standard (for example, 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (for example, together which form an auditory data stream over time), such as according to RTP and internet protocols (IP), to the PTT server. The PTT server then transmits the auditory data packets to other users of the PoC session (for example, to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (for example, talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller converts the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

In some embodiments, communication over the RAN 152 occurs over voice channels where voice data is communicated or over text channels (separate from the voice channels) where text data is communicated. In some embodiments, transmitting voice data over a voice channel utilizes more bandwidth of the RAN 152 and takes a longer period of time than transmitting text data over a text channel. Accordingly, channel availability of voice channels may be low or even nonexistent when many or all voice channels of the RAN 152 or fixed terminal 154 are in use. In some embodiments, sending text data over text channels is desirable due to the lower amount of bandwidth and time utilized by text channels in comparison to voice channels.

Group calls may be made between wireless and/or wireline participants in accordance with either a narrowband or a broadband protocol or standard. Group members for group calls may be statically or dynamically defined. That is, in a first example, a user or administrator working on behalf of the user indicates to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (for example, communication devices) could be provisioned in the network by the user or an agent, and then provided some form of group identity or identifier, for example. Then, at a future time, an originating user in a group may cause some signaling to be transmitted indicating that he or she wishes to establish a communication session (for example, group call) with each of the pre-designated participants in the defined group. In another example, communication devices dynamically affiliate with a group (and also disassociate with the group) perhaps based on user input, and the switching and/or radio network tracks group membership and route new group calls according to the current group membership.

In some instances, broadband and narrowband systems are interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1A, such a middleware server is disposed in infrastructure RAN 152 at infrastructure controller 156 or at a separate cloud computing cluster such as cloud computing cluster 162 communicably coupled to infrastructure controller 156 via internet protocol (IP) network 160, among other possibilities.

The infrastructure RAN 152 is illustrated in FIG. 1A as providing coverage for the portable radio 104, RSM video capture device 106, laptop 114, smart glasses 116, and/or vehicle transceiver 136 via a single fixed terminal 154 coupled to a single infrastructure controller 156 (for example, a radio controller, call controller, PTT server, zone controller, MME, BSC, MSC, site controller, Push-to-Talk controller, or other network device) and including a dispatch console 158 operated by a dispatcher. In other embodiments, additional fixed terminals and additional controllers are disposed to support a larger geographic footprint and/or a larger number of mobile devices.

The infrastructure controller 156 illustrated in FIG. 1A, or some other back-end infrastructure device or combination of back-end infrastructure devices existing on-premises or in the cloud computing cluster 162 accessible via the IP network 160 (such as the Internet), may additionally or alternatively operate as a back-end electronic digital assistant, a back-end audio and/or video processing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud computing cluster 162 may be comprised of a plurality of computing devices, such as the one set forth in FIG. 2, one or more of which may be executing none, all, or a portion of an electronic digital assistant service, sequentially or in parallel, across the one or more computing devices. The one or more computing devices comprising the cloud computing cluster 162 may be geographically co-located or may be separated by inches, meters, or miles, and inter-connected via electronic and/or optical interconnects. Although not shown in FIG. 1A, one or more proxy servers or load balancing servers may control which one or more computing devices perform any part or all of the electronic digital assistant service.

As shown in FIG. 1A, database(s) 164 may be accessible via the IP network 160 and/or the cloud computing cluster 162, and may include databases such as a long-term video storage database, a historical or forecasted weather database, an offender database perhaps including facial recognition images to match against, a cartographic database of streets and elevations, a traffic database of historical or current traffic conditions, or other types of databases. Databases 164 may further include all or a portion of the databases described herein as being provided at the infrastructure controller 156. In some embodiments, the databases 164 are maintained by third parties (for example, the National Weather Service or a Department of Transportation, respectively). As shown in FIG. 1A, the databases 164 are communicatively coupled with the infrastructure RAN 152 to allow the communication devices (for example, the portable radio 104, the RSM video capture device 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The databases 164 of FIG. 1A are merely examples. In some embodiments, the system 100 additionally or alternatively includes other databases that store different information. In some embodiments, the databases 164 and/or additional or other databases are integrated with, or internal to, the infrastructure controller 156.

Finally, although FIG. 1A describes a communication system 100 generally as a public safety communication system that includes a user 102 generally described as a police officer and a vehicle 132 generally described as a police cruiser, in other embodiments, the communication system 100 is a retail communication system including a user 102 that is an employee of a retailer and a vehicle 132 that is a vehicle for use by the user 102 in furtherance of the employee's retail duties (for example, a shuttle or self-balancing scooter). In other embodiments, the communication system 100 is a warehouse communication system including a user 102 that is an employee of a warehouse and a vehicle 132 that is a vehicle for use by the user 102 in furtherance of the employee's retail duties (for example, a forklift). In still further embodiments, the communication system 100 is a private security communication system including a user 102 that is an employee of a private security company and a vehicle 132 that is a vehicle for use by the user 102 in furtherance of the private security employee's duties (for example, a private security vehicle or motorcycle). In even further embodiments, the communication system 100 is a medical communication system including a user 102 that is a doctor or nurse of a hospital and a vehicle 132 that is a vehicle for use by the user 102 in furtherance of the doctor or nurse's duties (for example, a medical gurney or ambulance). In still another example embodiment, the communication system 100 is a heavy machinery communication system including a user 102 that is a miner, driller, or extractor at a mine, oil field, or precious metal or gem field and a vehicle 132 that is a vehicle for use by the user 102 in furtherance of the miner, driller, or extractor's duties (for example, an excavator, bulldozer, crane, front loader). Other possibilities exist as well.

As mentioned previously, many of the devices shown in FIG. 1A (such as the portable radio 104, the RSM video capture device 106, the laptop 114, the mobile communication device 133, the infrastructure controller 156, the dispatch console 158, and one or more computing devices in the cloud computing cluster 162) may be referred to as communication devices (for example, a communication device 200 as explained below with respect to FIG. 2). Although FIG. 1A shows multiple communication devices 200 associated with the user 102, in some embodiments, the communication system 100 includes communication devices 200 of multiple users. For example, as shown in FIG. 1B, the communication device 200A is associated with a first user, the communication device 200B is associated with a second user, and the communication device 200C is associated with a third user. As indicated by FIG. 1B, in some embodiments, the communication devices 200A, 200B, and 200C communicate with each other over the infrastructure RAN 152 and/or communicate with each other directly as described previously herein. Similarly, other devices, such as the dispatch console 158, may communicate with communication devices 200 of multiple users through the infrastructure RAN 152. In some embodiments, one or more users have multiple associated communication devices 200, for example, as shown in FIG. 1A.

b. Device Structure

Figure 2:
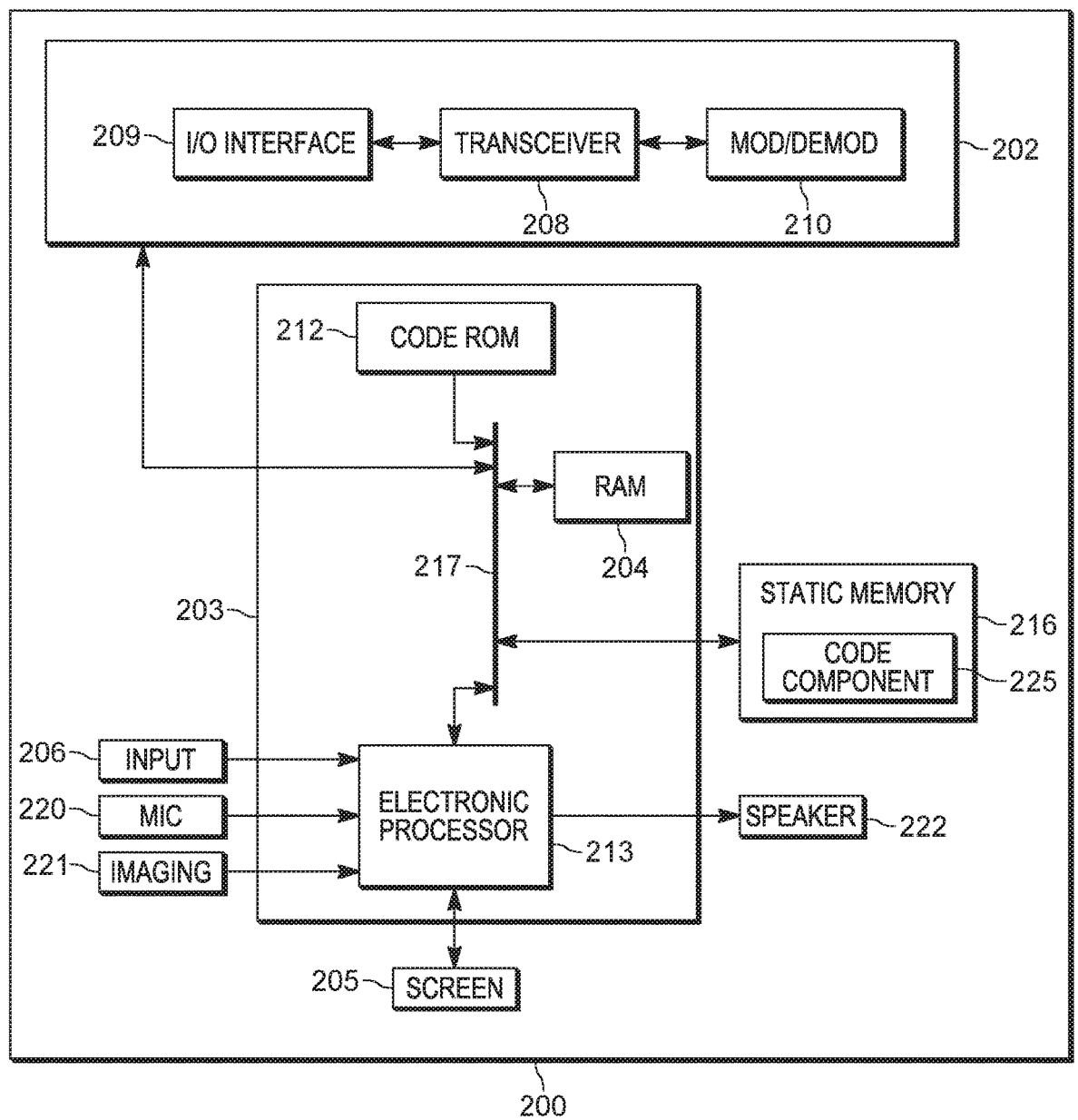
FIG. 2 is a device diagram showing a device structure of a communication device of the system of FIGS. 1A and 1B in accordance with some embodiments.

FIG. 2 sets forth a schematic diagram that illustrates a communication device 200 according to some embodiments of the present disclosure. The communication device 200 is, for example, embodied in the portable radio 104, the RSM video capture device 106, the laptop 114, the mobile communication device 133, the infrastructure controller 156, the dispatch console 158, one or more computing devices in the cloud computing cluster 162, or some other communication device not illustrated in FIG. 1A, and/or may be a distributed communication device across two or more of the foregoing (or multiple of a same type of one of the foregoing) and linked via a wired and/or wireless communication link(s). In some embodiments, the communication device 200 (for example, the portable radio 104) is communicatively coupled to other devices such as the sensor-enabled holster 118 as described above. In such embodiments, the combination of the portable radio 104 and the sensor-enabled holster 118 may be considered a single communication device 200. As another example, the mobile communication device 133 is communicatively coupled to an occupant sensor of the vehicle 132, and the combination is considered a single communication device 200.

While FIG. 2 represents the communication devices described above with respect to FIGS. 1A and 1B, depending on the type of the communication device, the communication device 200 may include fewer or additional components in configurations different from that illustrated in FIG. 2. For example, in some embodiments, the communication device 200 acting as the infrastructure controller 156 does not include one or more of the screen 205, microphone 220, imaging device 221, and speaker 222. As another example, in some embodiments, the communication device 200 acting as the portable radio 104 or the RSM video capture device 106 further include a location determination device (for example, a global positioning system (GPS) receiver) as explained above. Other combinations are possible as well.

As shown in FIG. 2, the communication device 200 includes a communications unit 202 coupled to a common data and address bus 217 of a processing unit 203. The communication device 200 may also include one or more input devices (for example, keypad, pointing device, touch-sensitive surface, button, a microphone 220, an imaging device 221, and/or another input device 206) and an electronic display screen 205 such as display screen 110 (which, in some embodiments, is a touch screen and thus also acts as an input device), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as the portable radio 104, the laptop 114, the wireless RAN 152, and/or the mobile communication device 133.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the microphone 220, the imaging device 221, the other input device 206, and/or the speaker 222. Static memory 216 may store operating code 225 for the electronic processor 213 that, when executed, performs one or more of the steps set forth in FIG. 3 and the accompanying text. In some embodiments, the static memory 216 also stores, permanently or temporarily, voice data or text data received from another communication device 200 such that the voice data or text data may be provided to the user 102 at a later time as explained in detail below.

The static memory 216 comprises, for example, a harddisk drive (HDD), an optical disk drive such as a compact disk (CD) drive or digital versatile disk (DVD) drive, a solid state drive (SSD), a tape drive, a flash memory drive, or a tape drive, and the like.

2. Processes for Responding to a Query in a Communication System Based on a Channel Availability of the Communication System In some embodiments, an individual component and/or a combination of individual components of the infrastructure RAN 152 is referred to as an electronic computing device or artificial intelligence server that implements an electronic digital assistant as mentioned above. For example, the electronic computing device is a single electronic processor (for example, an electronic processor of a back-end computing device included in the cloud computing cluster 162). In other embodiments, the electronic computing device includes multiple electronic processors distributed remotely from each other. For example, the electronic computing device is implemented on a combination of the electronic processor 213 of the infrastructure controller 156 and the electronic processor 213 of a back-end computing device in the cloud computing cluster 162 accessible via the IP network 160.

To use the electronic digital assistant implemented by the electronic computing device, the user 102, for example, provides an oral query that is received by the microphone 220 of the communication device 200. The communication device 200 of the user 102 receives signals representative of the oral query from the microphone 220 and communicates the signals to the electronic computing device of the RAN 152. The electronic computing device analyzes the signals to determine the content of the oral query. For example, the electronic computing device includes a natural language processing (NLP) engine configured to determine the intent and/or content of the oral query. The electronic computing device may also be configured to determine a response to the oral query (for example, by retrieving stored data or by requesting data from a database such as the database 164) and communicate the response back to the communication device 200 of the user 102. The communication device 200 of the user 102 may then output the response via an output device of the communication device 200 (for example, one or more of the speaker 222 via a generated audio response and the screen 205 via a generated text-based response). In other words, one or more of the communication device 200, embodied in one or more of the communication devices of FIG. 1A, such as the portable radio 104, the infrastructure controller 156, and the cloud computing cluster 162, may include a natural language processing engine to analyze oral queries received by the microphone 220 of the communication device 200 and provide responses to the oral queries.

Although an oral query is described above, in some embodiments, the electronic computing device receives and responds to other types of queries and inputs. For example, the user 102 submits a text query to the electronic computing device by typing the text query into a hard keyboard input device or a soft keyboard input provided on the screen 205 of the communication device 200. As another example, the user 102 uses the imaging device 221 to capture an image or video of an area and press a hard or soft key to send the image or video to the electronic computing device to, for example, allow the electronic computing device to identify an object in the image or video.

In some embodiments, the user query relates to public safety information. For example, the user query relates to a past or current public safety incident in which public safety officers (for example, firefighters, police officers, paramedics, and the like) engage in to protect the public and keep the public safe (for example, a building fire, a criminal pursuit or other law enforcement event, a natural disaster, a medical incident, a traffic accident, and the like). For example, the user query includes a request for information such as a location of a back-up public safety officer or a location to which a public safety officer should report. As another example, the user query includes a request for other public safety-related information such as information relating to a criminal (for example, a background check) or information relating to a recommended public safety procedure (for example, a guide on how to handle a particular public safety incident).

As explained above, the communication system 100 may have limited voice channel availability for communications involving voice data. Additionally, the communication system 100 may utilize less time for communications involving text data than for communications involving voice data (for example, due to the greater bandwidth used by communication over the voice channels as explained above). Thus, the electronic digital assistant transmitting a response to a user query using a voice channel of the communication system 100 may cause a technological problem of decreasing channel availability for other communication within the communication system 100. For example, transmitting the response as voice data over a voice channel may not be desirable when channel availability (in other words, voice channel availability) of the communication system 100 is low.

Figure 3:
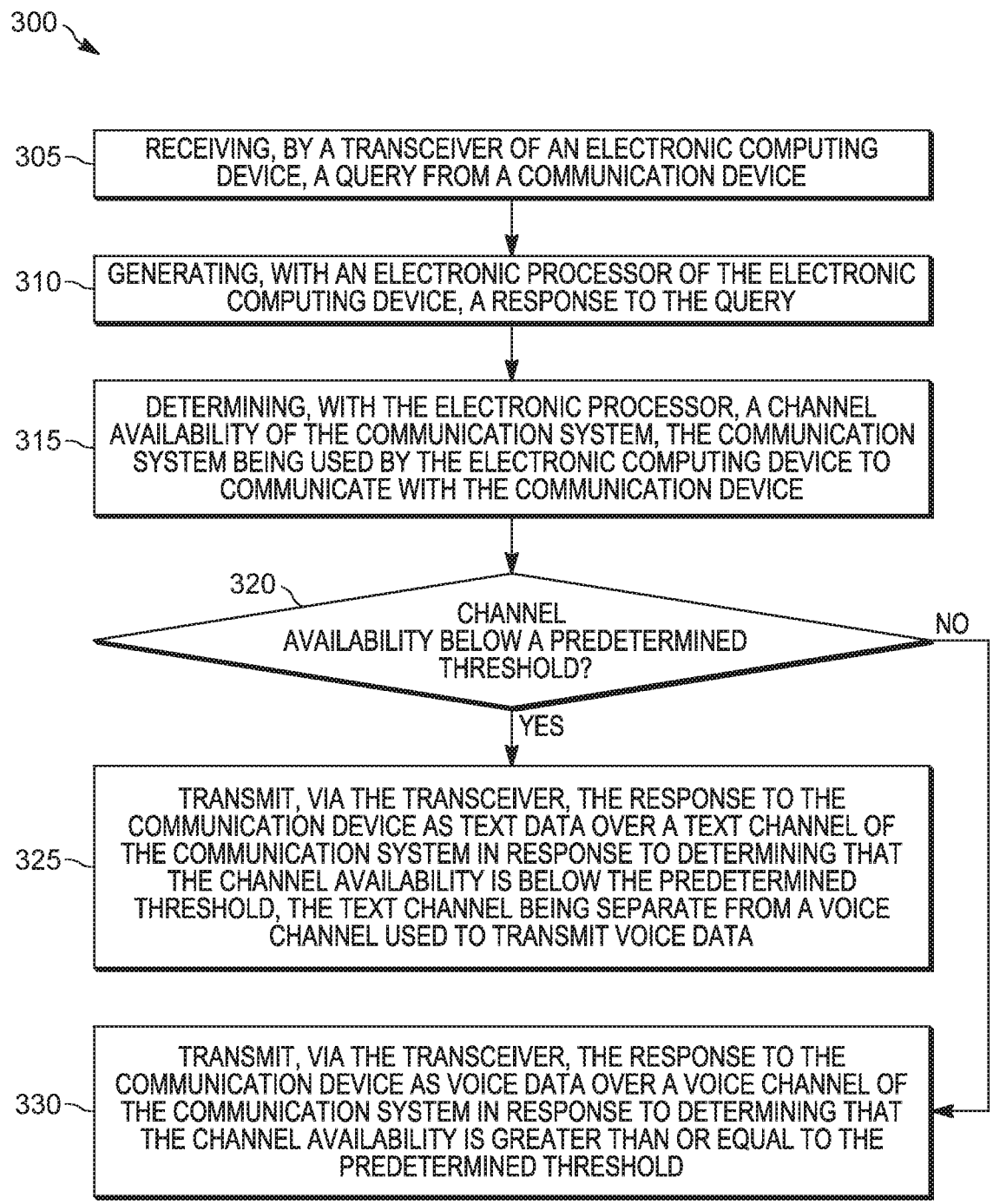
FIG. 3 illustrates a flow chart of a method of responding to a query in a communication system in accordance with some embodiments.

To solve this technological problem, the electronic computing device that implements the electronic digital assistant performs, in one instance, a method 300 illustrated in FIG. 3. In executing the method 300, the electronic computing device responds to a query in the communication system 100 based on a channel availability of the communication system 100. As explained in greater detail below, the method 300 solves a technological problem involving limited channel availability in the communication system 100 by transmitting responses as text data over text channels when voice channel availability is limited. The method 300 improves the overall functionality of the communication system 100 by allowing information to be transmitted in a more efficient manner and by helping to ensure that resources of the communication system 100 are available for more communication devices 200 than when the method 300 is not executed by the electronic computing device.

FIG. 3 illustrates a flow chart diagram of the method 300 performed by the electronic computing device for responding to a query in the communication system 100 based on a channel availability of the communication system 100. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure.

At block 305, the electronic computing device receives, via a transceiver 208, a query from a communication device 200 of the user 102. As explained above, the query may be transmitted to the electronic computing device after being received by the communication device 200 of the user 102 via an input device. Also as explained above, the query may be an oral query, a text query, or a query including an image or video, and may relate to public safety information.

At block 310, an electronic processor 213 of the electronic computing device generates a response to the query. As explained above, the electronic computing device may use a natural language processing engine to determine the intent and/or content of the query. The electronic computing device may generate a response to the query by retrieving stored data or by requesting data from a database such as the database 164.

At block 315, the electronic processor 213 of the electronic computing device determines a channel availability (in other words, a voice channel availability) of the communication system 100 that is being used to communicate with the communication device 200 of the user 102. In some embodiments, the electronic computing device determines the channel availability by monitoring voice channels of the communication system 100 and comparing the number of voice channels in use to stored information corresponding to a maximum number of voice channels of the communication system 100. For example, the electronic computing device determines a percentage of the maximum number of voice channels that are available. In some embodiments, the channel availability corresponds to the number of currently available voice channels (in other words, the number of voice channels of the communication system 100 or of a fixed terminal 154 that are not currently in use).

In some embodiments, the electronic computing device may request information corresponding to channel availability from one or more fixed terminals 154. For example, the electronic computing device may request channel availability of the fixed terminal 154 being used to communicate from the electronic computing device to the communication device 200 of the user 102. In some embodiments, the fixed terminal 154 supports a maximum number of voice channels. The fixed terminal 154 may provide its maximum number of voice channels and the number of voice channels currently in use to the electronic computing device. The electronic computing device may then determine the channel availability of the fixed terminal 154 using the information received from the fixed terminal 154. For example, the electronic computing device determines a percentage of the maximum number of voice channels that are currently available. In some embodiments, the fixed terminal 154 directly provides its channel availability percentage to the electronic computing device.

Although the above example embodiments involve determining channel availability based on current usage of voice channels, in some embodiments, the electronic computing device additionally or alternatively determines channel availability based on predicted usage of voice channels. For example, the electronic computing device determines that the channel availability is lower during historical peak usage times of the day (for example, between 7 PM and 11 PM) than during historical lesser usage times of the day (for example, between 4 AM and 7 AM). In this example, despite the same amount of voice channels being currently used, the electronic computing device may nonetheless determine that channel availability is lower during the historical peak usage times because an influx of requests for voice channels is more likely to occur during the historical peak usage times than during the historical lesser usage times. In other words, it is desirable to have more available voice channels during the historical peak usage times than during the historical lesser usage times.

At block 320, the electronic processor 213 of the electronic computing device determines whether the channel availability (in other words, the voice channel availability) is below a predetermined threshold. In some embodiments, the predetermined threshold is a percentage of the maximum number of voice channels of the communication system 100 or a fixed terminal 154 (for example, 50%, 25%, 10%, and the like). In some embodiments, the predetermined threshold is a number of available voice channels desired at any given time based on settings of the communication system 100. For example, the predetermined threshold is set to prevent the electronic computing device from using a voice channel to transmit a response to a query when there are less than a predetermined number of voice channels currently available (for example, ten, five, two, and the like).

When the electronic computing device determines that the channel availability is below the predetermined threshold, at block 325, the electronic computing device transmits, via the transceiver 208, the response to the query to the communication device 200 of the user 102 as text data over a text channel of the communication system 100 in response to determining that the channel availability is below the predetermined threshold. As explained above, the text channels of the communication system 100 are separate from the voice channels of the communication system 100. In some embodiments, transmitting text data over text channels is desirable due to a lower amount of bandwidth and time utilized by text channels in comparison to voice channels. Thus, when voice channel availability is below the predetermined threshold, the electronic computing device transmits responses to queries via the text channels in an attempt to keep the voice channels available for other communication (for example, communication between communication devices 200 of other users).

On the other hand, when the electronic computing device determines that the channel availability is greater than or equal to the predetermined threshold, at block 330, the electronic computing device transmits, via the transceiver 208, the response to the communication device 200 of the user 102 as voice data over a voice channel of the communication system 100 in response to determining that the channel availability is greater than or equal to the predetermined threshold. In other words, in some embodiments, the electronic computing device transmits the response to the query using voice data over the voice channel only when the channel availability of the communication system 100 or the fixed terminal 154 indicates that there are enough available voice channels to ensure that other communication devices 200 requesting a voice channel during transmission of the response to the query will also be allocated a voice channel.

As explained above, the channel availability may be based on predicted usage of voice channels (for example, based on historical usage during certain periods of a day). Similarly, in some embodiments, instead of adjusting the channel availability based on predicted usage of voice channels, the electronic computing device adjusts the predetermined threshold based on predicted usage of voice channels. For example, the electronic computing device determines that the predetermined threshold is higher during historical peak usage times of the day (for example, between 7 PM and 11 PM) than during historical lesser usage times of the day (for example, between 4 AM and 7 AM). In this example, despite the same amount of voice channels being currently used, the electronic computing device may nonetheless transmit a response to a query using a text channel during the historical peak usage times because an influx of requests for voice channels is more likely to occur during the historical peak usage times than during the historical lesser usage times. In other words, the predetermined threshold may be adjusted to attempt to maintain more available voice channels during the historical peak usage times than during the historical lesser usage times. As noted above, the predetermined threshold may be set to prevent the electronic computing device from using a voice channel to transmit a response to a query when there are less than a predetermined number of voice channels currently available or when there are less than a predetermined percentage of voice channels currently available.

Depending on whether the electronic computing device transmits the response to the query as voice data over a voice channel or as text data over a text channel, the communication device 200 of the user 102 receives the voice data or the text data from the electronic computing device. In some embodiments, the communication device 200 of the user 102 outputs the voice data on a speaker 222 in response to receiving the voice data from the electronic computing device over the voice channel. For example, the communication device 200 outputs the voice data on the speaker 222 after receiving and processing the voice data (for example, within 100 milliseconds, one second, five seconds, and the like of receiving the voice data). In some embodiments, the communication device 200 of the user 102 converts the text data to synthesized voice data in response to receiving the text data from the electronic computing device over the text channel. In response to the communication device 200 converting the text data to synthesized voice data, the communication device 200 outputs the synthesized voice data on the speaker 222. In other words, the communication device 200 of the user 102 receives text data from the electronic computing device and locally converts and outputs the text data on the speaker 222.

With respect to the above explanation of outputting voice data and synthesized voice data on the speaker 222 of the communication device 200, the "in response to" language indicates that the data is output on the speaker 222 within a predetermined response time of receipt or of conversion while allowing for processing time (for example, within 100 milliseconds, one second, five seconds, and the like of receipt or conversion). In some embodiments, the communication device 200 additionally or alternatively outputs the received text data on the screen 205 to allow the user 102 to read the text data.

In some embodiments, the electronic computing device takes other factors into account (in addition to or as an alternative to channel availability) when determining whether to transmit a response to a query over a voice channel, a text channel, or both. For example, such factors include noise level of an environment of the communication device 200 of the user 102, length of the response to the query, and the like.

In some embodiments, the electronic computing device determines a noise level of an environment of the communication device 200 of the user 102. For example, the electronic computing device receives information from the communication device 200 of the user 102 that is generated by the microphone 220 and indicative of an ambient noise level of the communication device 200. In some embodiments, the electronic computing device determines whether the noise level is above a predetermined noise threshold. For example, the predetermined noise threshold is set at a level in which the user 102 may have difficulty hearing voice data that is output via the speaker 222. In response to determining that the noise level is above the predetermined noise threshold, the electronic computing device transmits the response to the query as text data over a text channel instead of as voice data over a voice channel. Accordingly, the text data or synthesized voice data may be stored by the communication device 200 of the user 102 and output on the speaker 222 at a later time when the noise level has decreased. For example, the communication device 200 converts the received text data to synthesized voice data and monitors the noise level of the environment of the communication device 200 of the user 102 (for example, using the microphone 220). In response to determining that the noise level has decreased below the predetermined noise threshold, the communication device 200 outputs the synthesized voice data on the speaker 222. In some embodiments, the communication device 200 additionally or alternatively outputs the text data on the screen 205 to allow the user 102 to read the text data.

In some embodiments where the communication device 200 of the user 102 receives the response to the query as text data over a text channel, the communication device 200 is configured to store the text data or synthesized voice data and output the synthesized voice data upon receiving a user input indicating that the data should be output. For example, the communication device 200 converts the received text data to synthesized voice data and receives an input via an input device indicating that the synthesized voice data should be output. In response to receiving the input, the communication device 200 outputs the synthesized voice data on the speaker 222. In some embodiments, the communication device 200 outputs the text data on the screen 205 in response to receiving an input via an input device.

In some embodiments, the electronic computing device determines a length of the response to the query (for example, a number of words included in the response generated by the electronic computing device). In some embodiments, the electronic computing device determines that the response to the query is longer than a predetermined response length threshold (for example, ten words, fifty words, one hundred words, and the like). For example, the predetermined response length threshold is set at a level in which the user 102 may have difficulty remembering the content of the response due to its length. In response to determining that that the response to the query is longer than the predetermined response length threshold, the electronic computing device transmits the response to the communication device 200 of the user 102 as text data over a text channel and as voice data over a voice channel (assuming that the voice channel availability as determined in the method 300 is greater than or equal to the predetermined threshold as described above). Accordingly, the text data may be stored by the communication device 200 and output by the communication device 200 at a later time in the event that the user 102 did not fully comprehend the long response provided over the voice channel. In some embodiments, the communication device 200 converts the text data to synthesized voice data and outputs the synthesized voice data upon receiving a user input to do so. In some embodiments, the communication device 200 outputs the text data on the screen 205 to allow the user 102 to read the text data. In some embodiments, the electronic computing device summarizes the response and transmits a summarized version of the response as text data over a text channel for future reference by the user 102. For example, the electronic computing device may summarize a response that includes full sentences by removing some words while still conveying the main details of the response. As an example, the electronic computing device summarizes a response stating that "the temperature is 75 degrees and rain is possible after 4 pm" to "temperature: 75 degrees; rain possible later."

As indicated above, in some situations, the electronic computing device transmits responses to queries as voice data over voice channels. For example, when channel availability (in other words, voice channel availability) is greater than or equal to the predetermined threshold, the length of the response is less than or equal to the predetermined response length threshold, and a noise level of the environment of the communication device 200 of the user 102 is less than or equal to the predetermined noise threshold, the electronic computing device transmits the response to the query as voice data over a voice channel.

In some embodiments, the electronic computing device uses two or more of the previously-explained factors to determine whether to transmit a response to a query over a voice channel or a text channel. As one example, the electronic computing device adjusts the predetermined threshold of channel availability based on a length of the response to the query. For example, the electronic computing device increases the predetermined threshold of channel availability when the length of the response is longer than when the length of the response is shorter because the longer response will utilize a voice channel for a longer period of time. Thus, the longer response may be more likely to negatively impact other voice communications of the communication system 100. To attempt to prevent this negative impact, the electronic computing device increases the predetermined threshold of channel availability for longer responses such that a higher voice channel availability is required for transmitting longer responses over a voice channel than for transmitting shorter responses over a voice channel.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic computing device comprising:
a transceiver configured to receive signals representative of an oral query from a communication device, the communication device receiving the oral query via a microphone and generating the signals based on the oral query; and
an electronic processor configured to
generate, with a natural language processing engine, a response to the oral query,
determine a channel availability of a communication system that the electronic computing device uses to communicate with the communication device,
transmit, via the transceiver, the response to the communication device as voice data over a voice channel in response to determining that the channel availability is above a predetermined threshold, and
transmit the response to the communication device as text data over a text channel separate from the voice channel in response to determining that the channel availability is below the predetermined threshold;
wherein the electronic computing device communicates with the communication device via a fixed terminal;
wherein, to determine the channel availability of the communication system, the electronic processor is further configured to
determine a maximum number of voice channels that the fixed terminal is configured to support,
determine how many of the voice channels are currently in use, and
determine a percentage of the number of voice channels that are currently available.

2. The electronic computing device of claim 1, wherein the communication device is configured to transmit the signals representative of the oral query to the electronic computing device.

3. The electronic computing device of claim 1, wherein the communication device is further configured to
output the voice data on a speaker in response to receiving the voice data from the electronic computing device over the voice channel;
convert the text data to synthesized voice data in response to receiving the text data from the electronic computing device over the text channel, and
output the synthesized voice data on the speaker in response to the communication device converting the text data to the synthesized voice data.

4. The electronic computing device of claim 1, wherein the electronic processor is further configured to:
determine a noise level of an environment of the communication device; and
transmit the response to the communication device as the text data over the text channel in response to determining that the noise level is above a predetermined noise threshold.

5. The electronic computing device of claim 4, wherein the communication device is configured to:
convert the text data to synthesized voice data;
monitor the noise level of the environment of the communication device; and
output the synthesized voice data on a speaker in response to determining that the noise level is below the predetermined noise threshold.

6. The electronic computing device of claim 1, wherein the electronic processor is further configured to:
determine that the response to the oral query is longer than a predetermined response length threshold; and
transmit the response to the communication device as the text data over the text channel and as the voice data over the voice channel in response to determining that the response to the oral query is longer than the predetermined response length threshold.

7. The electronic computing device of claim 1, wherein the communication device is configured to:
convert the text data to synthesized voice data;
receive an input via an input device; and
output the synthesized voice data on a speaker in response to receiving the input.

8. The electronic computing device of claim 1, wherein the electronic processor is further configured to:
determine a length of the response to the oral query; and
adjust the predetermined threshold based on the length of the response to the oral query.

9. A method of responding to a query in a communication system, the method comprising:
receiving, by a transceiver of an electronic computing device, signals representative of a first oral query from a communication device, the communication device receiving the first oral query via a microphone and generating the signals based on the first oral query;
generating, with a natural language processing engine of an electronic processor of the electronic computing device, a first response to the first oral query;
determining, with the electronic processor, a first channel availability of the communication system, the communication system being used by the electronic computing device to communicate with the communication device;
determining, with the electronic processor, that the first channel availability is below a predetermined threshold;
transmitting, via the transceiver, the first response to the communication device as text data over a text channel of the communication system in response to determining that the first channel availability is below the predetermined threshold, the text channel being separate from a voice channel used to transmit voice data;

receiving, by the transceiver, a second oral query from the communication device;

generating, with the electronic processor, a second response to the second oral query;

determining, with the electronic processor, a second channel availability of the communication system;

determining, with the electronic processor, that the second channel availability is greater than or equal to the predetermined threshold; and transmitting, via the transceiver, the second response to the communication device as voice data over the voice channel of the communication system in response to determining that the second channel availability is greater than or equal to the predetermined threshold.

10. The method of claim 9, further comprising:
transmitting the signals representative of the first oral query from the communication device to the electronic computing device.

11. The method of claim 9, further comprising:
converting, with the communication device, the text data to synthesized voice data in response to receiving the text data from the electronic computing device over the text channel; and outputting the synthesized voice data on a speaker of the communication device in response to the communication device converting the text data to the synthesized voice data.

12. The method of claim 9, wherein determining at least one of a group consisting of the first channel availability and the second channel availability of the communication system includes:

determining, with the electronic processor, a maximum number of voice channels that a fixed terminal is configured to support, the fixed terminal being used for communication between the electronic computing device and the communication device;

determining, with the electronic processor, how many of the voice channels are currently in use; and determining, with the electronic processor a percentage of the number of voice channels that are currently available.

13. The method of claim 9, further comprising:
determining, with the electronic processor, a noise level of an environment of the communication device; and transmitting, via the transceiver, the first response to the communication device as the text data over the text channel in response to determining that the noise level is above a predetermined noise threshold.

14. The method of claim 13, further comprising:
converting, with the communication device, the text data to synthesized voice data;

monitoring, with the communication device, the noise level of the environment of the communication device; and outputting the synthesized voice data on a speaker of the communication device in response to determining that the noise level is below the predetermined noise threshold.

15. The method of claim 9, further comprising:
determining, with the electronic processor, that the first response to the first oral query is longer than a predetermined response length threshold; and transmitting, via the transceiver, the first response to the communication device as the text data over the text channel and as the voice data over the voice channel in response to determining that the first response to the first oral query is longer than the predetermined response length threshold.

16. The method of claim 9, further comprising:
converting, with the communication device, the text data to synthesized voice data;

receiving an input via an input device of the communication device; and outputting the synthesized voice data on a speaker of the communication device in response to receiving the input.

17. The method of claim 9, further comprising:
determining, with the electronic processor, a length of at least one of a group consisting of the first response and the second response; and adjusting, with the electronic processor, the predetermined threshold based on the length of the at least one of the group consisting of the first response and the second response.

18. A communication system comprising:
a communication device configured to receive an oral query via a microphone and transmit signal representative of the oral query to an electronic computing device, the electronic computing device configured to
receive the oral query from the communication device, generate, with a natural language processing engine, a response to the oral query, determine a channel availability of the communication system, transmit the response to the communication device as voice data over a voice channel in response to determining that the channel availability is above a predetermined threshold, wherein the communication device is configured to output the voice data on a speaker, transmit the response to the communication device as text data over a text channel separate from the voice channel in response to determining that the channel availability is below the predetermined threshold, wherein the communication device is configured to convert the text data to synthesized voice data to be output by the speaker, determine a length of the response to the oral query, and adjust the predetermined threshold based on the length of the response to the oral query.

* * * * *